United States Patent [19]

Findlay et al.

[11] Patent Number: 5,892,176
[45] Date of Patent: *Apr. 6, 1999

[54] SMOOTH SURFACED FIBER OPTIC LOGGING CABLE FOR WELL BORES

[75] Inventors: Mitchell Findlay, Whittier, Calif.;
Phillip E. Pruett, 12417 Highway 178, Bakersfield, Calif. 93306

[73] Assignee: Phillip E. Pruett, Bakersfield, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 747,005

[22] Filed: Nov. 5, 1996

[51] Int. Cl.⁶ .................................................. H01B 7/02
[52] U.S. Cl. ........................................ 174/115; 174/102 R
[58] Field of Search .................................... 174/115, 116, 174/117 AS, 113 AS, 113 C, 77 R, 102 R

[56] References Cited

U.S. PATENT DOCUMENTS

| | | | |
|---|---|---|---|
| 2,605,315 | 7/1952 | Hargett | 174/77 R X |
| 2,655,638 | 10/1953 | Allen | 174/77 R X |
| 2,963,536 | 12/1960 | Kokalas | 174/77 R |
| 3,504,102 | 3/1970 | Polizzano | 174/115 X |
| 4,144,530 | 3/1979 | Redfern | 174/70 R X |
| 4,665,281 | 5/1987 | Kamis | 174/102 R |
| 4,686,153 | 8/1987 | Tominaga et al. | 174/126 CP X |
| 4,765,711 | 8/1988 | Obst | 174/70 R X |
| 4,778,246 | 10/1988 | Carroll | 174/115 X |
| 4,895,426 | 1/1990 | Pinson | 174/70 R X |
| 4,941,349 | 7/1990 | Walkow et al. | 285/133.2 X |
| 4,976,142 | 12/1990 | Perales | 73/155 |
| 5,189,719 | 2/1993 | Coleman et al. | 174/102 R X |
| 5,275,038 | 1/1994 | Sizer et al. | 73/151 |
| 5,478,970 | 12/1995 | Lawler et al. | 174/74 R |
| 5,493,626 | 2/1996 | Schultz et al. | 385/101 |

*Primary Examiner*—Dean A. Reichard
*Attorney, Agent, or Firm*—Don E. Erickson

[57] ABSTRACT

A cable for recording conditions in a well bore, the cable including a tube having a generally smooth outer surface and an inner surface defining an elongated, uninterrupted opening extending throughout the length of the tube, at least one fiber optic, disposed within the opening of the tube, the fiber optic extending the length of the tube, an electrical conductor disposed within the opening of the tube, the electrical conductor extending the length of the tube, and insulating material disposed within the tube, the insulating material encapsulating the fiber optic and electrical conductor so as to form a core, wherein the core is of substantially smaller diameter than the opening to permit thermal expansion of the fiber optic, the conductor and the insulating material. The size of the tube and the core may be selected such that there is an annulus between the inside surface of the tube and the outside surface of the core, the annulus providing a flowpath extending the length of the tube.

17 Claims, 1 Drawing Sheet

SMOOTH SURFACED FIBER OPTIC LOGGING CABLE FOR WELL BORES

FIELD OF THE INVENTION

This invention generally pertains to cables used for profiling oil, gas and geothermal fields, and more particularly to cables for measuring flow parameters and for monitoring other conditions in the well bore.

BACKGROUND OF THE INVENTION

Oil, gas and geothermal wells are traditionally surveyed by electrical sensors or other tools lowered in a well bore by a cable with an inner copper conductor for powering the tools as well as providing a pathway to transmit data from the sensors. A typical cable will have an inner electrical conductor surrounded by multiple strands of steel armor. Such cables are costly, especially when built for use in corrosive environments, and they are difficult to build. Moreover, cables of known and conventional construction provide internal woven spiral interstitial paths through which gas and other corrosive elements hazardous to the environment can escape upwardly. Efforts to eliminate such leakage add further to the costs of sensing and are generally not entirely successful.

Fiber optic cable has been used in telecommunications for a number of years. Its main advantage over copper cable relates to "bandwidth" where a fiber cable can carry much more data or information. Technology has now progressed to a point where downhole sensors used in oil, gas or steam wells can generate so much information, that they can benefit from the additional bandwidth fiber optic cable can provide. A conventional copper cable is still necessary to provide a path for electricity to power down hole sensors.

In many cases, the well can also be quite deep, and the length of the down-hole instrument cable can exceed 15,000 feet. Longitudinal stresses placed on an optical fiber in such a long cable can sever or fracture the optical fiber, causing significant signal attenuation. Hence, the cable must be designed not only to resist physical damage to its outer surface from use in the well, and provide a robust fluid seal to protect the optical fiber and electrical conductors, but also to support the weight of the down-hole instrument and the cable itself.

Many wells are relatively small in diameter, on the order of 4.5 cm (1.75 in). Consequently the instrument probe and its cable designated for use in such a well are limited in their respective diameters. This can lead to practical problems when a high pressure well is involved. Such wells are capped to prevent the uncontrolled escape of high pressure well fluids and, in order to insert an instrument such as an electrical sensor in such a well, the instrument must be forced into the well through the cap. As is well known in the art, smaller instruments are easier to insert into a high pressure environment because they present less surface area against which the high pressure well fluids can act. High pressure well fluids oppose entry of the cable into the well and the cable must be made heavy enough to overcome the fluid pressure force. Also, it has been found that small differences in the diameters of down-hole instrument cables can have a tremendous impact on the ease and expense in inserting a cable and an attached instrument into the well.

As taught in U.S. Pat. No. 5,493,626 to Schultz, et al, a well pressure of 281 kg/cm$^2$ (4000 psi), a cable with a 1.11 cm (7/16 in (0.438)) diameter will require the addition of 295 kg (650 lbs) additional weight to overcome the force against it created by the well fluid pressure to enter the well. One common technique for adding that weight is to attach sinker bars to the cable. The diameter of the well limits the diameter of the sinker bars requiring a longitudinal distribution of the weight along the cable. In a 4.5 cm (1.75 in) diameter well, sinker bars having the standard outside diameter of 3.5 cm (1.375 in) would be used. Even if using high density tungsten weights, each bar would be 1.8 meters (6 ft) long and have a weight of 20.4 kg (45 lbs). This would result in the need for 15 sinker bars placed end to end on the cable, and at 1.8 m (6 ft) each, a total length of 27.4 m (90 ft) of sinker bars results, adding this length to the length of the instrument itself, which may be 4.5 meters (15 ft), resulting in a total length of 31.9 meters (105 ft) for the complete assembly.

The cable must be raised above the well head and inserted through a pressure gland through lubricator risers, and past the main valve. In this case with such a long length of weights, an extended crane would be required to lift the assembly of instrument, cable, and sinker bars over the main valve of the well head and the specially attached lubricator risers attached to the well head to accommodate the assembly. It has been found in some cases that the expense involved in supporting such a long length of lubricator risers rises, the need for high crane heights, and the amount of time involved in assembling and disassembling outweigh the advantage that would be provided by down-hole monitoring.

Also as shown in the '626 patent, a cable having a diameter of 0.55 cm (7/32 in (0.218)) (approximately half the cable diameter of the prior art) and in a well having the same pressure of 281 kg/cm$^2$ (4000 psi), the weight required to overcome the fluid pressure and insert the cable into the well is only 77 kg (170 pounds), which is approximately one fourth of the weight required for a cable twice its size. Using the same tungsten weight bars as described above, only four are required and at 1.8 meters (6 ft) each, the total length of the lubricating risers needed to accommodate the weights and the instrument is 12 meters (39 ft). It is clear that small changes in cable diameter result in much larger changes in weight requirements. Hence those concerned with high pressure wells have recognized the substantial effect that cable diameter has and have recognized the need for a reduced diameter cable so that insertion into high pressure wells is facilitated and made less expensive. Another consideration in cable design is the impact of the cable length on the size of the internal cable components. In the case of a coaxial cable, the longer the cable, the larger the cable diameter must be to support needed data transmission parameters for pressure, temperature and real-time video monitoring. It has been found that optical fibers are not as sensitive as coaxial cable to long distances and have large band-widths capable of supporting both monitoring and real-time video imaging. The use of fiber optics enables use of a much smaller diameter cable.

Distributed Temperature Sensing (DTS) is a method of monitoring temperature along a well bore. DTS uses a fiber optic cable as the temperature sensor. The fiber optic cable is installed along the full length of a well. A laser may then be attached to the end of the fiber that protrudes from the well at the surface. A laser beam excites the atoms of the fiber. The stimulated atoms send back a light pulse whose frequency is shifted due to the temperature of the atoms along the fiber. The laser system, through systematic pulses, can monitor temperature along the entire length of the fiber. Hence, the optic fiber becomes a temperature sensor, permitting the reading of the temperature gradients and changes along the well path.

However, the fiber optic cables that have been used for this purpose can not withstand exposure to well bore fluids that can cause damage to or disintegration of the fiber. Hermetically sealed coatings have been added to provide this protection, but existing cable with such coatings are expensive to build, do not account for the differing thermal expansion properties of the components of the cables, nor are such cables effective to inhibit the release of harmful gases which may escape from the well bore because of the woven and/or braided cable used to protect the cable.

One example of a cable that has been used in DTS systems is described in the '626 patent. An optical fiber is surrounded by a protective buffer layer and a protective gel and is inserted in a thin walled stainless steel tubing. The optic cable and buffer layer is then sealed within the stainless steel tubing, and the steel tubing is then covered by a copper wire netting, or mesh. The copper mesh provides a path for the electrical current used to power a down hole logging tool and/or light source. The combination of fiber optic cable, steel tubing and wire mesh is then encapsulated in a plastic layer of polyurethane insulation.

A first layer of spring steel armor wire is helically wound around the outer surface of the polyurethane insulation, and a second layer of spring steel armor wire helically wound in the opposite direction around the outer surface of the first layer of spring steel armor. The first and second layers of spring steel armor wire protect the fiber optic cable and electrical conducting mesh from physical damage in the borehole and to add tensile strength to enable pulling the cable, and any instrumentation suspended from such cable, from the well bore.

However, this cable design has inherent problems because of the numerous separate strands comprising the mesh that serves as a protective surface for cable. Typically, when employing the cable in a well bore, any braided cable is run through several narrow flow tubes, each about 6" long, that have a small hole down the center. The inside diameter of the hole is only several thousandths of an inch larger that the outer diameter of the cable. Such a design still permits the release of oil or gas from any well under high pressure. It is therefore common practice to seal, or "pack off," this escape route by injecting a thick, heavy grease in the space between the flow tube and the cable, as well as any gaps between the strands. This grease injection process is labor intensive and unreliable.

Additionally, since the mesh of the '626 patent includes two layers of wire wound in helically opposite directions, it is extremely difficult to sealingly pack off the first layer, thus providing a possible path for harmful oil and/or gas release through the interstitial gaps of the helically woven wire. And since the outside surface of the cable is comprised of wire strands, the strands under friction, tension and tensile forces can break or become deformed, resulting in wire projections and/or bunching of wires, commonly called a "birdcage," around the cable which then binds the cable in the flow tubes, thereby significantly increasing the amount of force necessary to remove the cable from the well bore, and thereby increasing the opportunity for damage to the fiber optics in the cable. If such "birdcaged" cable is abandoned in the well bore, additional costs are incurred.

SUMMARY OF THE INVENTION

The present invention describes a fiber optics cable for use in well bores for measuring conditions in the well bore which is substantially smaller in diameter than the cable of the prior art. The invention includes a method for manufacturing such cable. The fiber optic cable of the invention is much simpler to manufacture and install than any cable of the prior art, resulting in significantly lower manufacturing costs.

The cable includes a fiber optic strand, or fiber optic bundle, (hereinafter, for the purposes of the invention, both strand and bundle are simply referred to as a "fiber optic") encapsulated with an electrical conductor and inserted in a small diameter stainless steel tubing. The cable includes a tube having a space therewithin extending the length of the tube. A fiber optic and an electrical conductor, in generally parallel alignment with each other, are disposed in the space and extend the length of the tube. The electrical conductor provides power to instruments at the down hole end of the cable. An insulating material is disposed within the space of the tube and encapsulates the fiber optic and electrical conductor, extending the length of the fiber optic and electrical conductor, so as to form a core in the tube in such a manner as to seal the combination of fiber optic and electrical conductor from exposure from any of the elements in the well bore. The tube, fiber optic, conductor and insulating material are selected such that the core is substantially smaller than the inside diameter of the tube.

The instant invention addresses many of the problems of the prior art since encasing all of the cable components and conductors in a smooth outer walled tubing makes getting a seal, or a pack off, at the head of the well, when the well is under pressure, much safer and easier to accomplish. The outer wall tubing of the instant invention may have rubber seals or grommets encircling the smooth surface to wipe the tube clear of any oil, and to seal well pressure. Since the surface of the cable is smooth, the fine particles of sand or debris commonly present in wells, will not tend to adhere to that surface, reducing the tendency for wear and abrasion to the well tubing and to the cable of the invention.

Encasing the fiber optics with the conductor simplifies the manufacturing and installation of the cable, as well as insulating the fiber optics from well bore fluids. Much of the problems associated with differing coefficients of expansion of the various elements making up cables exemplary of the existing art are eliminated by allowing the encased fiber optics and conductor to lie free in the protective tubing. Since the exterior surface of the cable is smooth, the problems of "birdcaging" of the prior art are eliminated. Allowing the encased fiber optics and cable to lie free in the smaller diameter smooth outer walled tubing additionally provides the ability to utilize the inner annulus of the cable for pressure sensing, without the need for additional tubing or apparatus.

As discussed above, the cross-sectional area of the wireline, or cable, is the primary determining factor for the amount of weight necessary to enable the cable to be installed in a high pressure well bore. The cable of the invention will have approximately fifty percent of the area of the cable of the '626 patent, and hence will require approximately twenty five percent of the amount of weight necessary to insert the cable. Concomitantly, there will be a corresponding savings of approximately forty percent in the energy required to remove the cable from the well bore.

Other advantages of the invention will become apparent upon review of the drawings and descriptions that follow. Not all the advantages specifically stated herein necessarily apply to every embodiment of the invention. Further, such stated advantages of the invention are only exemplifications and should not be construed as the only advantages of this invention. Additional features of the present invention are described with reference to the drawings and detailed description of the preferred embodiments.

DETAILED DESCRIPTION

Figure 1:
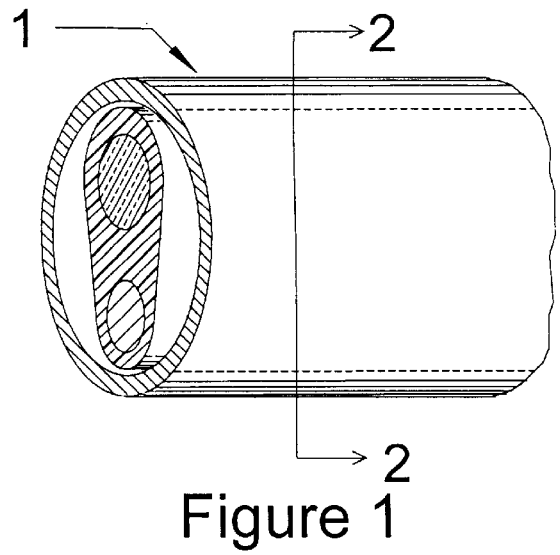
FIG. 1 is a pictorial view of a section of the cable of the invention.

A cable 1 constructed in accordance with the method of the invention is shown in FIG. 1. A fiber optic is selected for the type of monitoring required for a particular application. The fiber optic typically is manufactured with a protective covering based on the environment to which the cable will be subjected. Typical fiber optics are available with coverings such as acrylate, which has a temperature rating of approximately 250° F., and polyamide, which has a temperature rating of approximately 700° F. Other fiber optics are available which have protective covering, such as a layer of carbon, which are physical barriers. Such cables are well known in the field and commonly available.

Figure 2:
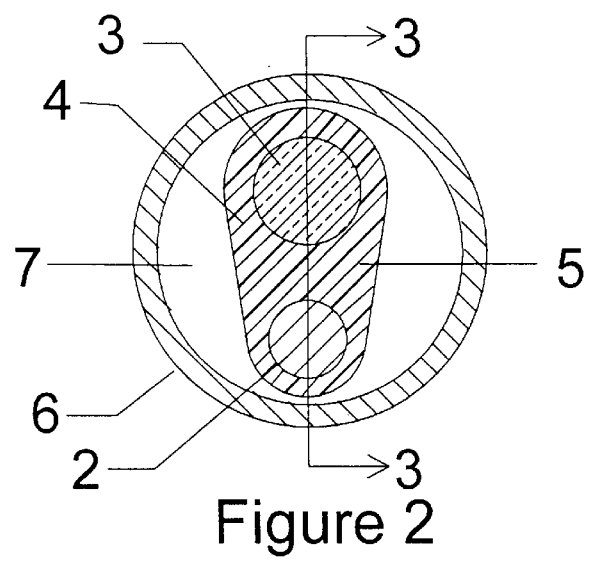
FIG. 2 is a pictorial view, partially in cross-section, of the cable of FIG. 1 at the section line 2—2.
Figure 3:
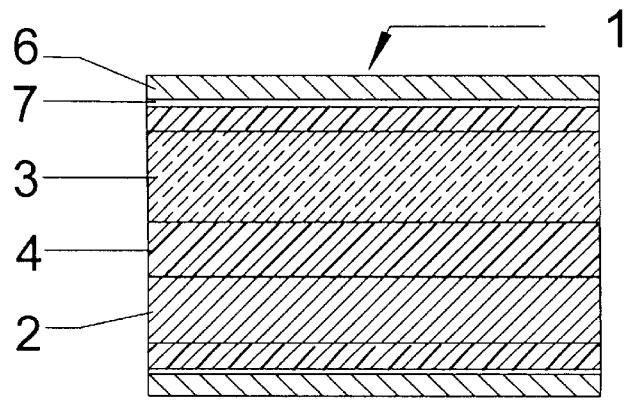
FIG. 3 is a cross-sectional view of the cable of FIG. 2 at the section line 3—3.

Referring now to FIGS. 2 and 3, the method of constructing cable 1 includes disposing a length of fiber optic 2 and a length of electrical conductor 3 in a generally parallel alignment. The combination of fiber optic 2 and electrical conductor 3 is then encapsulated in an insulating material 4, so as to form a core 5, with the insulating material extending for the length of fiber optic 2 and conductor 3. In the preferred embodiment the fiber optic 2 and the electrical conductor 3 are maintained in their spaced-apart, generally parallel alignment in order that the conductor not abrade the coating on fiber optic 2. The encapsulation of fiber optic 2 and conductor 3 hermetically seals them from the corrosive elements of the well bore in the event of rupture of tube 6. Fiber optic 2 and electrical conductor 3 may be encapsulated by extruding a heat resistant insulation such as a thermosetting Flouroethylenepolyamide (FEP), with a temperature range to 400° F., a thermosetting Tefzell, with a temperature range to 500° F., or by wrapping a thermosetting Kapton, with a temperature range to 700° F. Selection of such materials as FEP, Tefzell or Kapton for a selected environment is well within the capabilities of one of ordinary skill in the art, since their electrical and thermal properties are published and publicly available from companies such as E.I. duPont de Nemours & Co.

In this exemplary embodiment, the fiber optic cable is multimode cable of a 50/125 size with a polyamide coating, and the electrical conductor is a copper-plated 16 gauge solid steel wire, which has an electrical resistance of 13.6 ohms per 1000 feet. The insulation consists of a 0.025 inch wall of Teflon FEP coating, resulting in an overall outside diameter of 0.1 inch for the encapsulated combination of fiber optic bundle and electrical conductor. Further, utilizing a copper coated solid steel wire as a conductor provides additional tensile strength to cable 1 for support of the measuring tools attached to the down hole end of the cable. A 16 guage steel wire has a breaking load of approximately 270 pounds. Since the combined weight of cable 1 is 50 pounds per 1000 feet, the steel wire itself could support a portion of the combined weight of cable 1 and any attached monitoring devices.

Since the fiber optic 2, electrical conductor 3 and insulating material 4 have known thermal coefficients of expansion at different temperatures and pressures, tubing 6 can be selected such that there is no possibility of abrasion, binding, stretch or separation of the insulated fiber optic 2 and electrical conductor 3 while it is inserted in a well bore, thereby avoiding many of the problems experienced with fiber optics cable of the prior art.

Tube 6 is constructed having an elongated opening extending its entire length. The size of tube 6 is selected such that the opening, shown in cross-section of the cable in FIG. 2, is of sufficient diameter to provide an annulus 7 between the interior surface of tube 6 and the exterior surface of core 5 when the core is inserted in tube 6, thereby enabling thermal expansion of the fiber optic 2, conductor 3 and insulating material 4, and also allowing for some movement of core 5 within tube 6. The surface of the insulation 4 may be made sufficiently smooth to facilitate the insertion of core 5 through the length of tube 6. Core 5 is then inserted in a tube 6. In this exemplary embodiment the tube was a 316L stainless steel tubing, typically of 0.156 inch outside diameter with 0.022 inch wall thicknesses. Such stainless steel tubing of 0.25 and less outside diameter is known to one of ordinary skill in the art as capillary tubing. Such a tubing is capable of sustaining an ultimate load of 1175 pounds, and has a tensile strength of 130,000 psi. Such tubing typically has 1025 pounds load at yield and 6–12% elongation.

Alternatively, core 5 can be formed and placed on a substantially flat, elongated stainless steel material, the material formed into a generally circular tube surrounding core 5 such that the edges of the elongated material abut, and the abutting surfaces of the material brazed so as to form a tube surrounding core 5, with core 5 then encapsulated therewithin. The selected tube material may be the same as in the embodiment above, having like or similar size parameters and strength properties.

In a second preferred embodiment the components are selected such that annulus 7 extends the length of tube 6 to additionally provide a flowpath between core 5 and tube 6 which may be used to charge annulus 7 at the surface with a fluid under pressure. Such fluid may then be used for taking pressure measurements at selected depths in the well bore, for accommodating other cables, or for the insertion of tracer elements under pressure in the annulus and into the well bore as taught in patent application Ser. No. 08/696,325.

FIGS. 1 and 2 show the cables of the preferred embodiment to be in a generally non-concentric relationship, extending the length of the cable. However, such non-concentric relationship is not necessary for the cable of the invention to function as designed. There are various methods in which the fiber optic and the conductor may be insulated and maintained in their parallel relationship for the length of the cable, which methods are known to those of ordinary skill in the art.

As discussed above, the invention disclosed herein is not restricted to the number of fiber optic strands that may be included in a fiber optic bundle, nor is the method restricted to the number of electrical conductors that may be encapsulated therewith. The tube may be of any selected material that will withstand the variances of pressure and temperature within the length of the well bore.

While the present description contains many specificities, these should not be construed as limitations on the scope of the invention, but rather as an exemplification of one/some preferred embodiment/s thereof. In the preferred embodiment, the insulating material maintains the spaced-apart alignment of the fiber optic strand and the electrical conductor, with the insulating material extending the length of the tube so as conductor 3 does not abrade fiber optic 2. However, it is contemplated that conductor 3 may be coated with a non-abrasive material, and such a coated conductor may then be placed in a position abutting fiber optic 2 for all or part of the length of fiber optic 2. Concomitantly, many other variations are possible, for example, conventional multi-stranded copper wire could replace the conductor 3 in the exemplary embodiment.

Accordingly, the fiber optic cable of the invention may be utilized for unlimited purposes, i.e. temperature sensing, pressure sensing, tracer injection, video examination, and for any other purposes where fiber optics are desired in corrosive environments. Accordingly, the scope of the invention should not be determined by the specific embodiments illustrated herein, but rather in light of the full scope of the claims appended hereto.

We claim:

1. A cable for recording conditions in a well bore, the cable comprising:
   (a) a tube having a generally smooth outer surface and an inner surface defining an elongated, uninterrupted opening extending throughout the length of the tube, the tube of a material capable of withstanding well bore pressures;
   (b) at least one fiber optic, disposed within the opening of the tube, the at least one fiber optic extending the length of the tube;
   (c) at least one electrical conductor disposed within the opening of the tube, the at least one electrical conductor extending the length of the tube; and
   (d) insulating material disposed within the tube, the insulating material being a homogeneous body which is in direct contact with an entire circumference of the at least one fiber optic and the at least one electrical conductor so as to form a core, wherein the core is of sufficiently smaller diameter than the opening to permit thermal expansion of the at least one fiber optic, the at least one conductor, and the insulating material.

2. The cable of claim 1 wherein the size of the tube and the core are selected such that there is an annulus between the inner surface of the tube and an outside surface of the core, the annulus providing a flowpath extending the length of the tube.

3. The cable of claim 1 wherein the tube, having a known tensile strength, is selected such that the tensile strength of the tube will support the weight of a measuring tool at a selected depth in the well bore.

4. The cable of claim 3 wherein the at least one conductor, having a known tensile strength, is selected such that the tensile strength of the at least one electrical conductor, in combination with the tensile strength of the tube, support the weight of the measuring tool at the selected depth in the well bore.

5. The cable of claim 4 wherein the at least one electrical conductor is a copper-coated solid steel wire.

6. The cable of claim 1 wherein the at least one fiber optic and the at least one electrical conductor are maintained in generally spaced-apart, parallel alignment for the length of the tube.

7. The cable of claim 1 wherein the at least one electrical conductor is coated with a non-abrasive material.

8. The cable of claim 1 in which the at least one electrical conductor extends the length of the tube in an offset, non-concentric relationship with the at least one fiber optic.

9. The cable of claim 1 wherein the tube is fabricated of stainless steel.

10. A cable for recording conditions in a well bore, the cable comprising:
    (a) a tube having a generally smooth outer surface and an inner surface defining an elongated, uninterrupted opening extending throughout the length of the tube, the tube of a material capable of withstanding well bore pressures;
    (b) at least one fiber optic, disposed within the opening of the tube, the at least one fiber optic extending the length of the tube;
    (c) at least one electrical conductor disposed within the opening of the tube, the at least one electrical conductor extending the length of the; and
    (d) insulating material disposed within the tube, the insulating material being a homogeneous body which is in direct contact with an entire circumference of the at least one fiber optic and the at least one electrical conductor so as to form a core, wherein the core is of sufficiently smaller diameter than the opening to permit thermal expansion of the at least one fiber optic, the at least one electrical conductor and the insulating material, and wherein the size of the tube and the core are selected such that there is an annulus between the inner surface of the tube and an outside surface of the core, the annulus providing a flowpath extending the length of the tube.

11. The cable of claim 10 wherein the tube, having a known tensile strength, is selected such that the tensile strength of the tube will support the weight of a measuring tool at a selected depth in the well bore.

12. The cable of claim 11 wherein the at least one conductor, having a known tensile strength, is selected such that the tensile strength of the at least one electrical conductor, in combination with the tensile strength of the tube, support the weight of the measuring tool at the selected depth in the well bore.

13. The cable of claim 12 wherein the at least one electrical conductor is a copper-coated solid steel wire.

14. The cable of claim 10 wherein the at least one fiber optic and the at least one electrical conductor are maintained in substantially spaced-apart, parallel alignment for the length of the tube.

15. The cable of claim 10 wherein the at least one electrical conductor is coated with a non-abrasive material.

16. The cable of claim 10 in which the at least one electrical conductor extends the length of the tube in an offset, non-concentric relationship with the at least one fiber optic.

17. The cable of claim 10 wherein the tube is fabricated of stainless steel.

* * * * *

UNITED STATES PATENT AND TRADEMARK OFFICE
CERTIFICATE OF CORRECTION

PATENT NO. : 5,892,176
DATED : April 6, 1999
INVENTOR(S) : Mitchell Findley, Phillip E. Pruett It is certified that error appears in the above-identified patent and that said Letters Patent is hereby corrected as shown below:

In column 8, line 18, after the second occurence of the word "the" insert --tube--.

Signed and Sealed this

Twenty-seventh Day of July, 1999

Attest:

Q. TODD DICKINSON

*Attesting Officer*  *Acting Commissioner of Patents and Trademarks*